United States Patent [19]

Turchan et al.

[11] Patent Number: 4,964,766

[45] Date of Patent: Oct. 23, 1990

[54] METHOD AND APPARATUS FOR MACHINING A CASTING SURFACE

[76] Inventors: Manuel C. Turchan, 25075 Fairway; Frank J. Manduch, 24644 Cherry Hill Rd., both of Dearborn, Mich. 48124

[21] Appl. No.: 125,235

[22] Filed: Nov. 25, 1987

[51] Int. Cl.$^5$ ............................................. B23Q 3/00
[52] U.S. Cl. ...................................... 409/225; 269/27; 269/47; 269/142; 269/254 R; 269/289 R; 269/900
[58] Field of Search ............... 409/131, 141, 219, 225; 269/24, 25, 27, 32, 47, 140, 142, 254 R, 268, 289 R, 296, 297, 303, 305, 315, 900

[56] References Cited

U.S. PATENT DOCUMENTS

| | | |
|---|---|---|
| 1,254,044 | 1/1918 | Johnson . |
| 2,142,034 | 5/1936 | Patrick . |
| 2,472,083 | 6/1949 | Bartholdy .......................... 269/297 |
| 2,699,708 | 1/1955 | Fotsch . |
| 2,833,089 | 5/1958 | Beauloye et al. . |
| 3,194,548 | 7/1965 | Zwick . |
| 3,279,783 | 10/1966 | Blankenship .......................... 269/47 |
| 4,033,569 | 7/1977 | Dunn . |
| 4,121,817 | 10/1978 | Pavlovsky . |
| 4,630,811 | 12/1986 | Rudisill . |
| 4,645,391 | 2/1987 | Fallert .............................. 409/225 |

FOREIGN PATENT DOCUMENTS

| | | | |
|---|---|---|---|
| 1402895 | 12/1968 | Fed. Rep. of Germany | 269/305 |
| 3201891 | 10/1982 | Fed. Rep. of Germany | 269/24 |
| 206638 | 2/1984 | German Democratic Rep. | 269/25 |
| 224251 | 7/1985 | German Democratic Rep. | 279/1 F |
| 223661 | 6/1989 | German Democratic Rep. | 269/25 |
| 1283023 | 1/1987 | U.S.S.R. | 269/296 |

Primary Examiner—Daniel Howell
Attorney, Agent, or Firm—Remy J. VanOphem

[57] ABSTRACT

A fixturing apparatus for locating, orienting and holding a workpiece during a milling operation, having a workpiece specific mounting provided with means for accurately and reproducibly positioning the workpiece within the fixture. The workpiece specific mounting has a workpiece specific pattern of clamping, vibration dampening and supporting devices to hold the workpiece during the milling operation. Accurate, reproducible location and orientation of successive workpieces of the same geometry on the apparatus for the same milling operations is achieved quickly and positively and vibration and workpiece distortion are minimized during the milling operations.

8 Claims, 22 Drawing Sheets

IFig-7

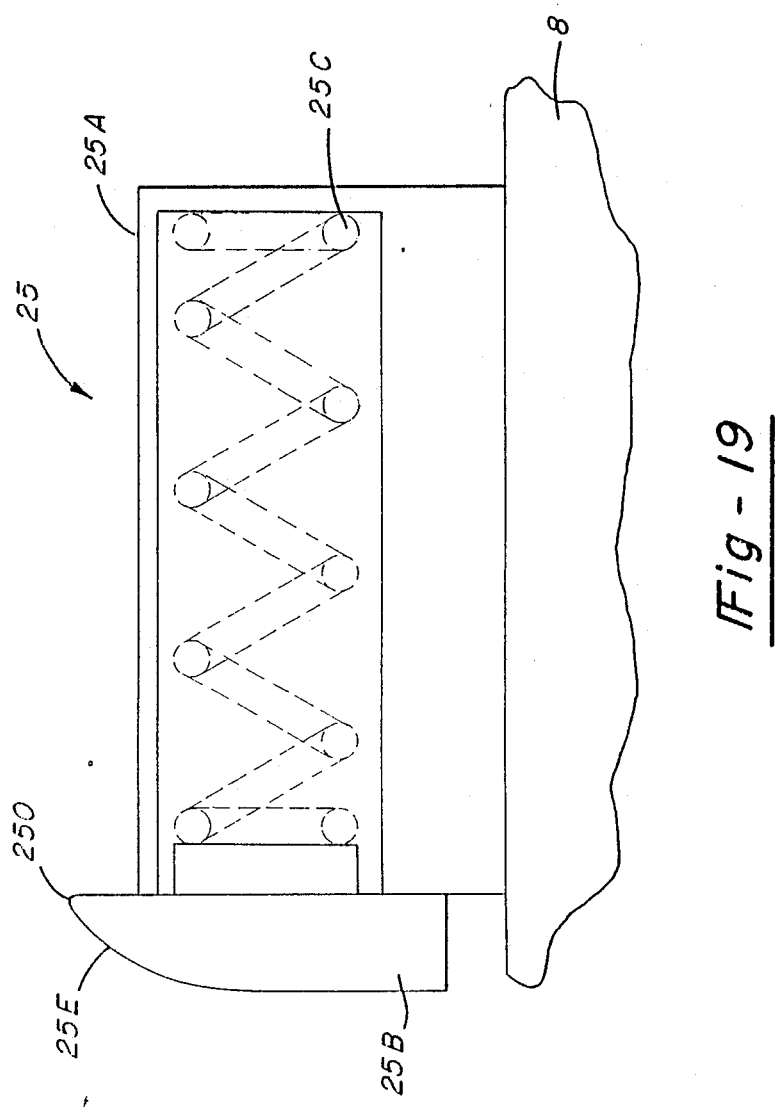

METHOD AND APPARATUS FOR MACHINING A CASTING SURFACE

BACKGROUND OF THE INVENTION

1. Field of the Invention

This application relates to a method and apparatus for milling a thin automobile transmission control valve body.

2. Description of the Prior Art

The present invention relates to the milling of a thin, lightweight, and therefore fragile, automobile valve body. This fragile body is thinner than most production automobile automatic transmission control valve bodies.

Automobile valve bodies may have an irregular shape. Usually, one or more surfaces are machined to have a flat surface.

In the past, this has been done primarily by a grinding method in which the surface of the workpiece is ground away. This method is less consistent than high speed diamond milling.

Because of the fragile nature of this workpiece, special supports and arrangements must be used in order to properly mill the surface. The irregular shape of the workpiece creates special problems that are in addition to those created by the part's lack of stiffness.

To applicants' knowledge, the prior art does not disclose a satisfactory method or apparatus for milling a thin, lightweight, fragile automobile transmission valve body. The prior art discloses support apparatus and methods for milling irregularly shaped objects such as an engine block (see e.g., U.S. Pat. No. 2,833,089). The combination of vibration dampeners, locating pin supports, and the hydraulic operation of clamps used while milling automobile transmission valve bodies of this type is not disclosed in the prior art.

SUMMARY OF THE INVENTION

To fully understand the following description of the workpiece it should be read while viewing the illustrations. In the particular embodiments of the invention disclosed herein, the workpiece to be machined is a casting of an automatic transmission valve body known as a Ford AOD automatic overdrive transmission valve body. This body is used to provide automatic transmission valve conduits in an automobile equipped with an automatic transmission. The automatic transmission is operated by the running of fluids through different conduits in the body.

This casting has an unusual shape. It has a top or Z surface (as seen in FIG. 16), a bottom surface opposite the Z surface (as seen in FIG. 17) and an edge all the way around having a surface on it connecting the Z surface to the bottom surface. The thickness of the casting varies from a maximum of 1⅝ inch to a minimum of 11/16 inch.

The bottom surface is substantially planar. This planar surface is interrupted, however, by stress supports, the curved delineations of fluid conduits and other support points. Generally, as seen in FIG. 17, the fluid conduits are lined in a direction paralleling the widthwise direction going from the front to the back of the workpiece. Only three fluid conduits can be seen going across the direction of the other conduits, lengthwise of the body. Various holes exist in the workpiece going from the Z surface to the bottom surface, some go all the way through and others do not. A web of vertical aluminum lines go across the bottom of the casting, adding support to the casting. The casting is very thin as compared to other castings used for similar purposes.

The top surface of the casting is in the Z plane. The top surface is made up of the top of a lot of different curved and longitudinally vertically raised walls. The top of these walls all lie in the same Z plane and they can form what is referred to as the Z surface. There are cylindrical parts A (see FIG. 17) of aluminum that start in the Z surface plane and extend downward; they are interconnected with the aforementioned walls. Below the Z surface are conduits in the walls that are coextensive with the conduit delineations on the bottom of the workpiece. These conduits create holes in the edge surface of the workpiece. The walls create channels. The channels carry fluid and when under pressure, operate to actuate transmission valves.

The overall shape of this workpiece is irregular. For the sake of description, it will be referred to as follows: Referring to FIG. 17, there is a main body part M and two flanges M1 and M2. The main body part consists of the three sides S1, S2 and S3, and the parts in between, that have fairly continuous, uninterrupted surfaces. The two flanges M1, M2 that protrude from this main body part will be identified as ears. The larger protrusion, or ear M1, will be identified as the first ear and the smaller ear M2 will be identified as the second ear.

Because the piece is made of aluminum and is thin and therefore fragile and has two ears projecting from it, it is a very difficult piece to accurately mill. The piece tends to deflect during milling creating an uneven final cut. The Z surface is the surface to be milled. The workpiece is thin, the ears project out and because it is made of aluminum, it is difficult to mill this piece with close tolerances. The vendee specifies that the workpiece be milled within 0.0018 inches tolerance on a 4 sigma basis. The milling process itself tends to distort the shape of the casting. The fact that the two ears protrude and are so small, causes distortion in the workpiece and the ears during the milling process. The entire casting, the main body, and the ears, must be supported and held in such a way as to prevent this distortion during milling.

BRIEF DESCRIPTION OF THE DRAWINGS

Other advantages of the present invention will be readily appreciated as the same becomes better understood by reference to the following detailed description when considered in connection with the accompanying drawings wherein:

FIG. 19 is a partial section of the push clamp 25.

DETAILED DESCRIPTION OF THE PREFERRED EMBODIMENT

Figure 1:
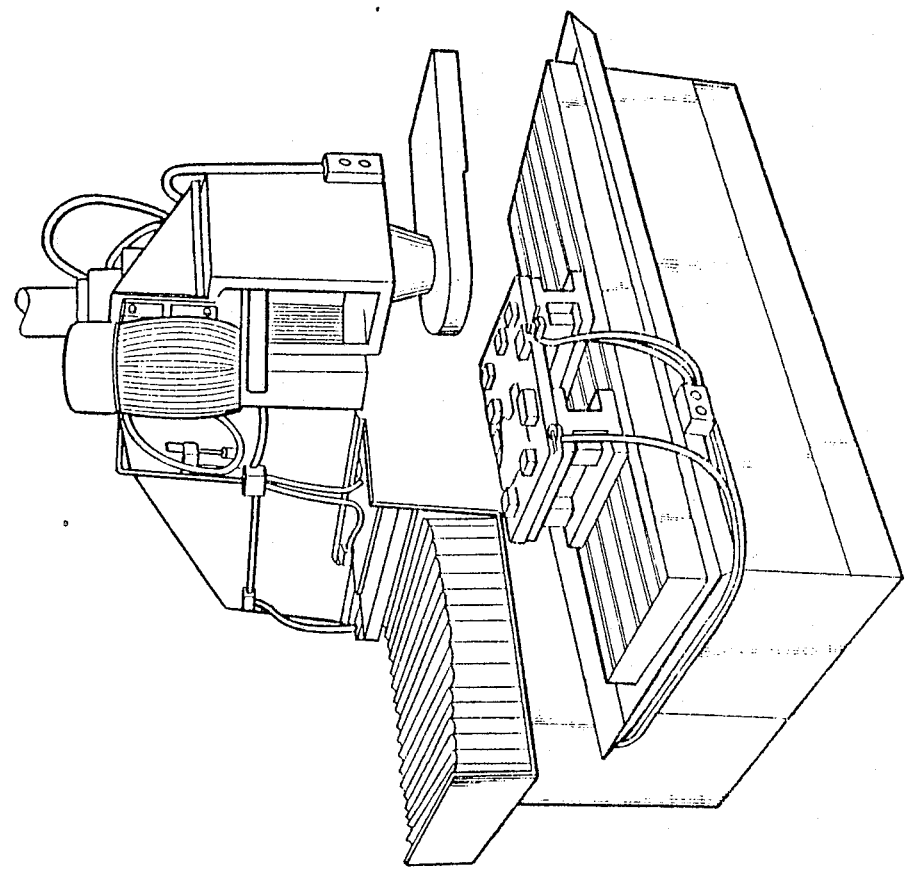
FIG. 1 is a perspective view of a machine used for milling automobile automatic transmission control valve bodies.

FIG. 1 shows generally the fixture of the present invention mounted in an exemplary milling machine.

Figure 8:
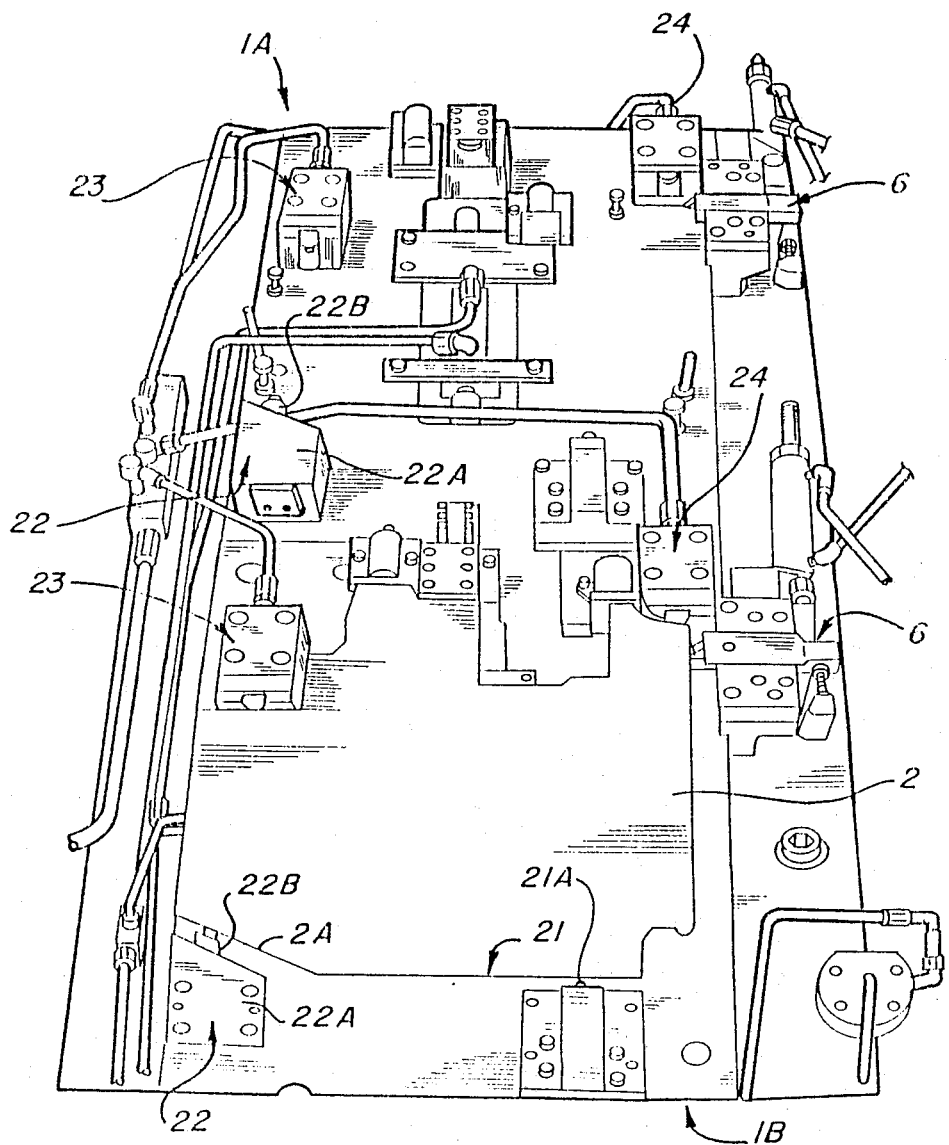
FIG. 8 is a top view of the fixture for supporting automobile transmission control bodies showing a wedge lock clamp 6 of the invention not actuated.

FIG. 8 shows two fixturing apparatuses 1A and 1B. Like elements of fixtures 1A and 1B are labelled with common reference numerals. A workpiece 2A is shown in outline form in apparatus 1B.

Figure 2:
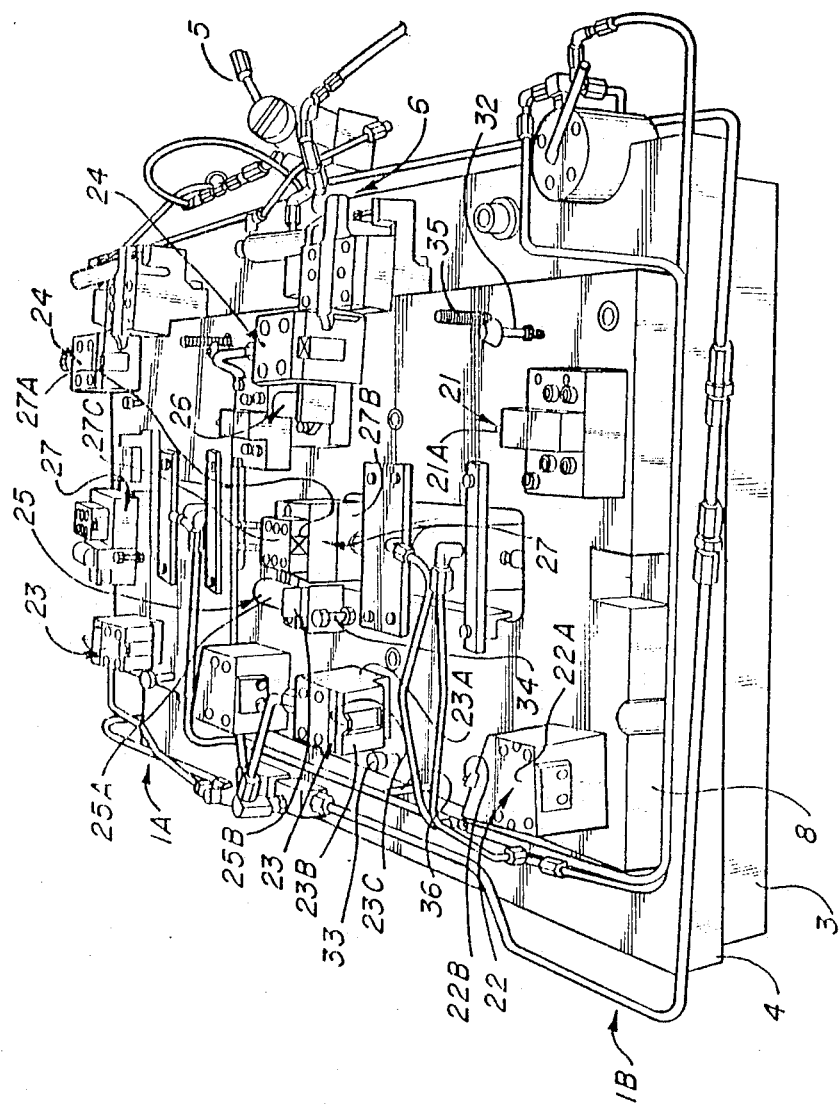
FIG. 2 is a perspective view of a fixture used to support automobile transmission control valve bodies during a milling operation.
Figure 3:
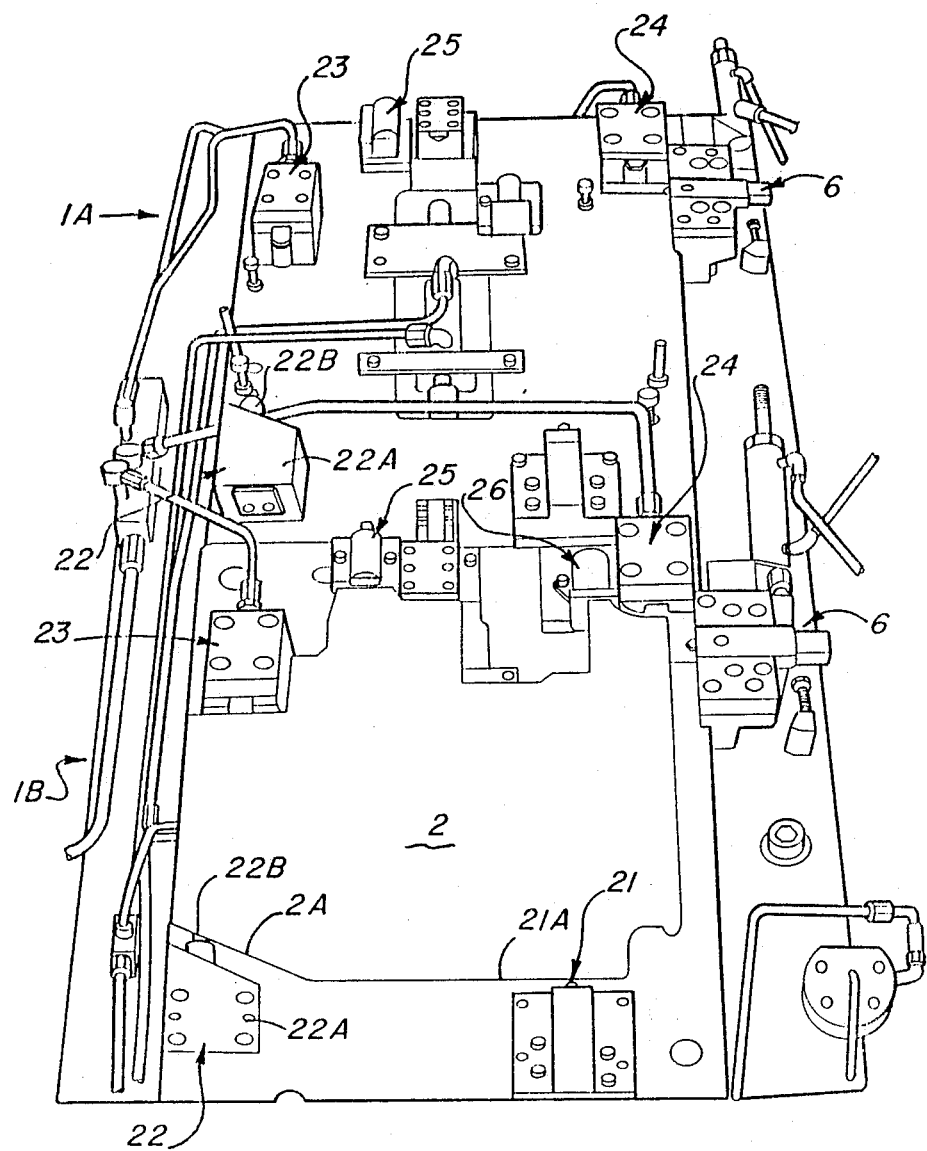
FIG. 3 is a top view of the fixture used to support automobile transmission control valve bodies with the outline of a body in the lower section.
Figure 4:
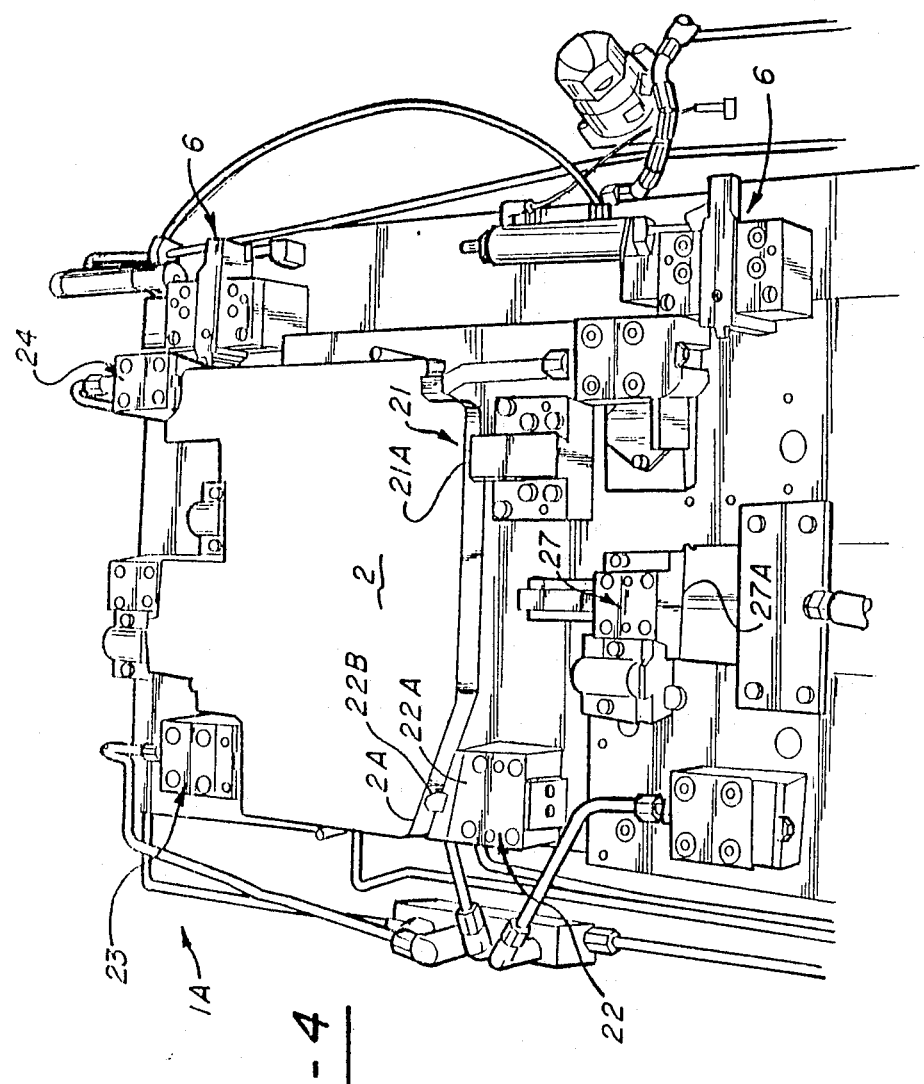
FIG. 4 is a top view of a fixture used to support automobile transmission control valve bodies having the outline of a body in place in the rear section of the fixture.
Figure 5:
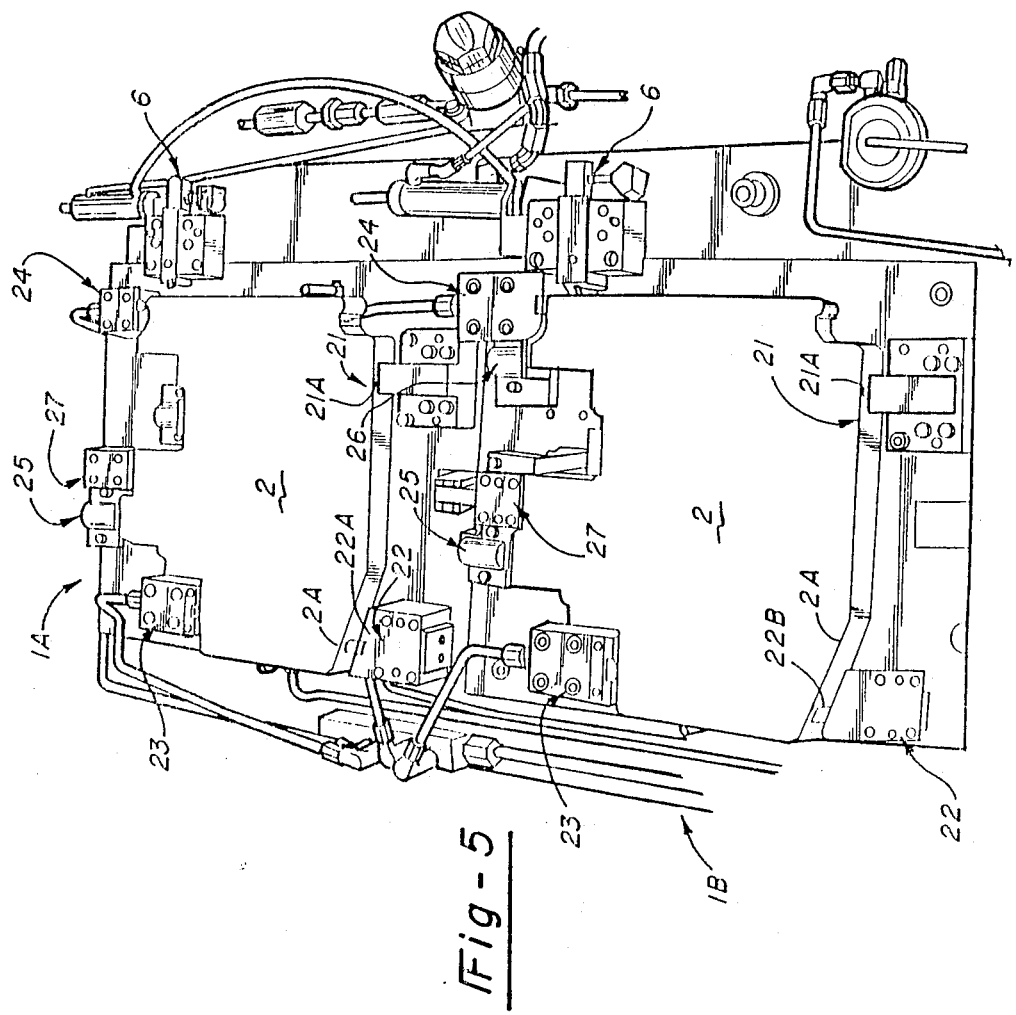
FIG. 5 is a top view of a fixture used for supporting automobile transmission control valve bodies with two workpieces outlined.
Figure 6:
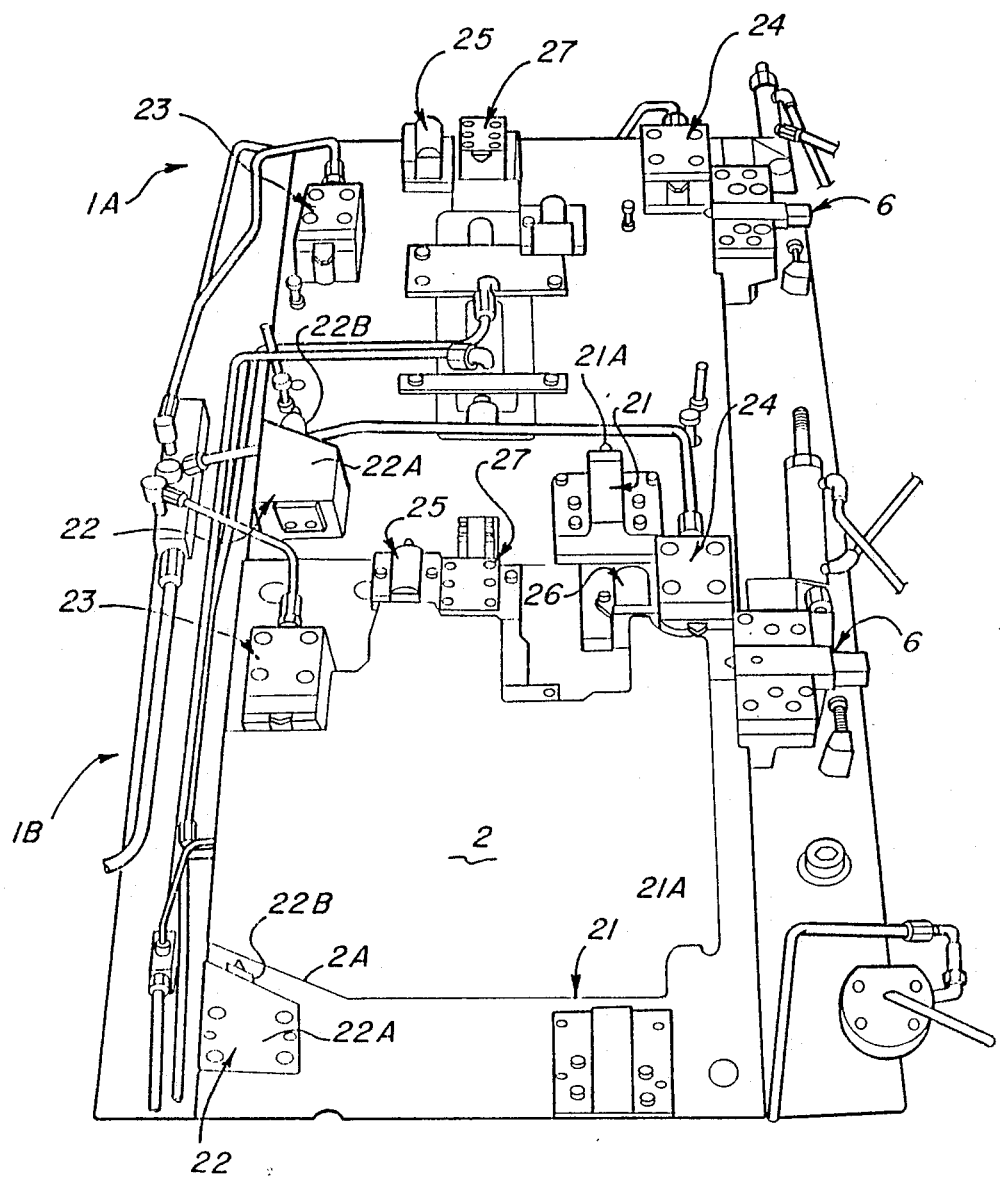
FIG. 6 is a top view of the fixture for supporting automobile transmission control valve bodies having an outline of a body in one of the two fixtures showing the locators and dampeners in the nonactuated position.
Figure 7:
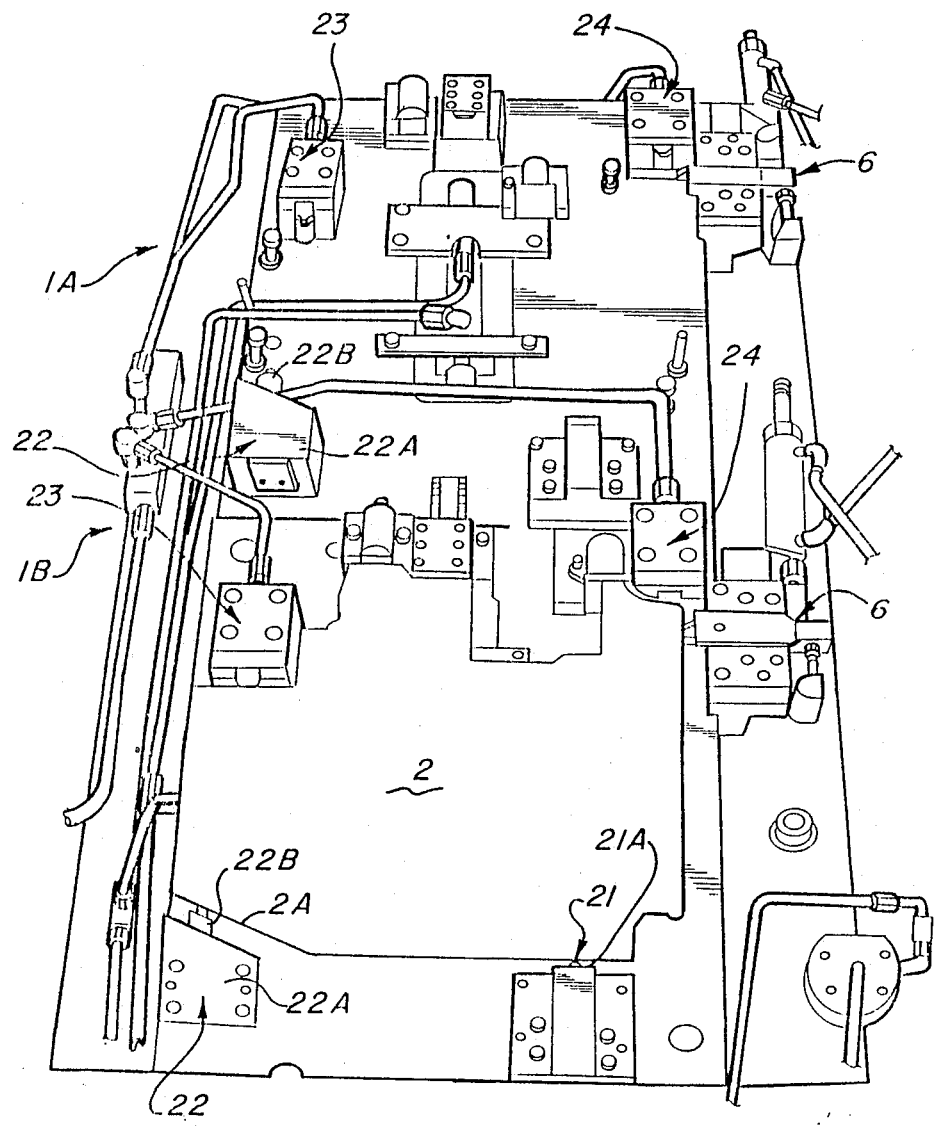
FIG. 7 is a top view of the fixture for supporting automobile transmission control valve bodies having an outline of a body in one of the two fixtures showing the locators and dampeners in the actuated position.

Referring to FIGS. 2 and 8, a first foundation is shown at 3. On this foundation rests the dual fixturing apparatuses 1A and 1B. Above the overall foundation 3 is a second foundation 4. The second foundation 4 is larger in length and width than the first foundation 3. The second foundation 4 has various apparatus attached to it that are used to operate the fixturing apparatus and support the workpiece. On this second foundation 4 is mounted a switch 5 which operates some of the hydraulic systems used in supporting the workpiece during the milling operation. The switch 5 consists of a lever for moving back and forth between two positions, one being the ON, or actuated position, the other being the OFF, or non-actuated position. The switch 5 is securely mounted to the outer edge of a portion of the second foundation 4.

Figure 9A:
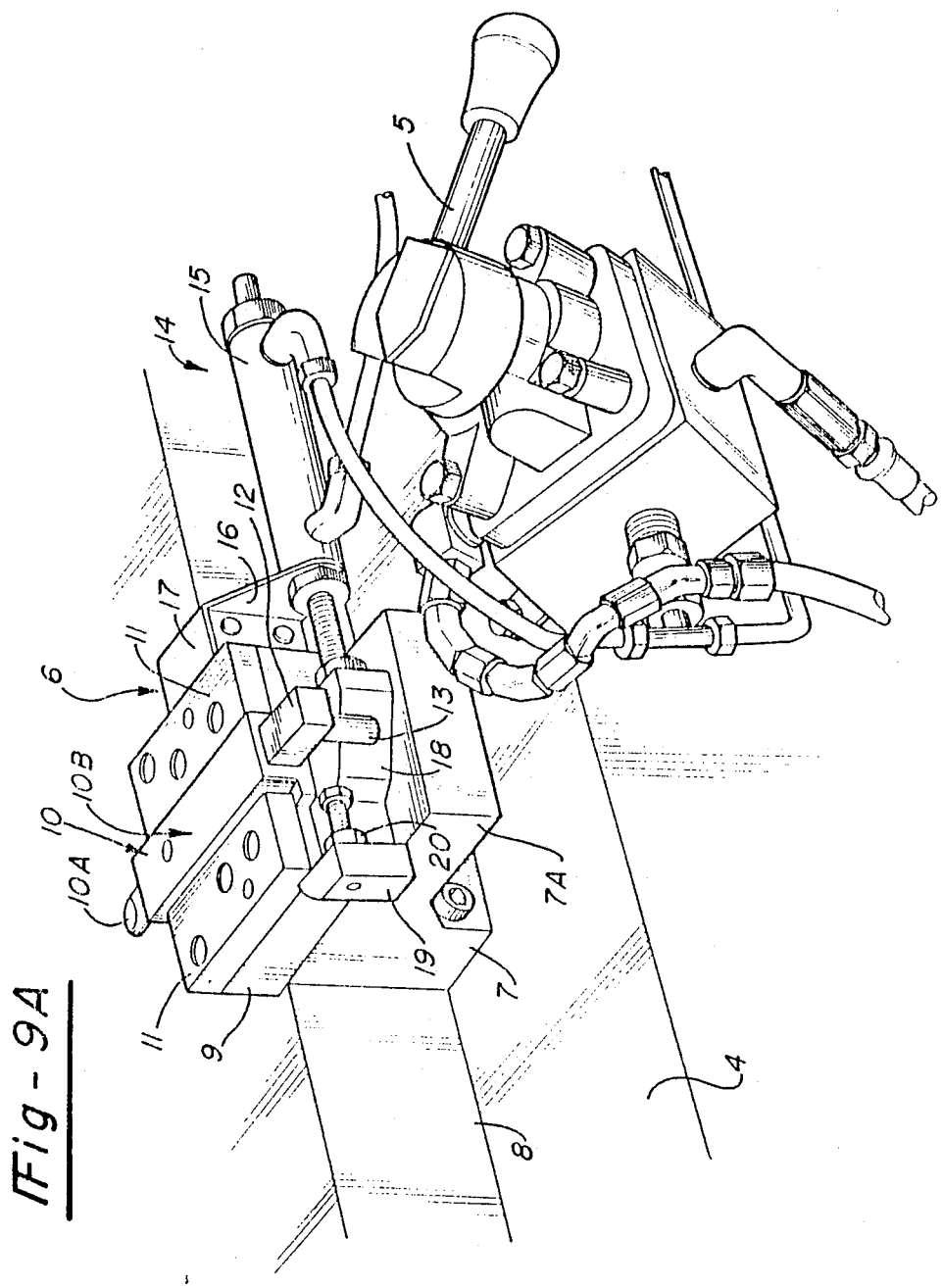
FIG. 9A is a perspective view of the hydraulically operated wedge lock clamp in the retracted position.
Figure 9B:
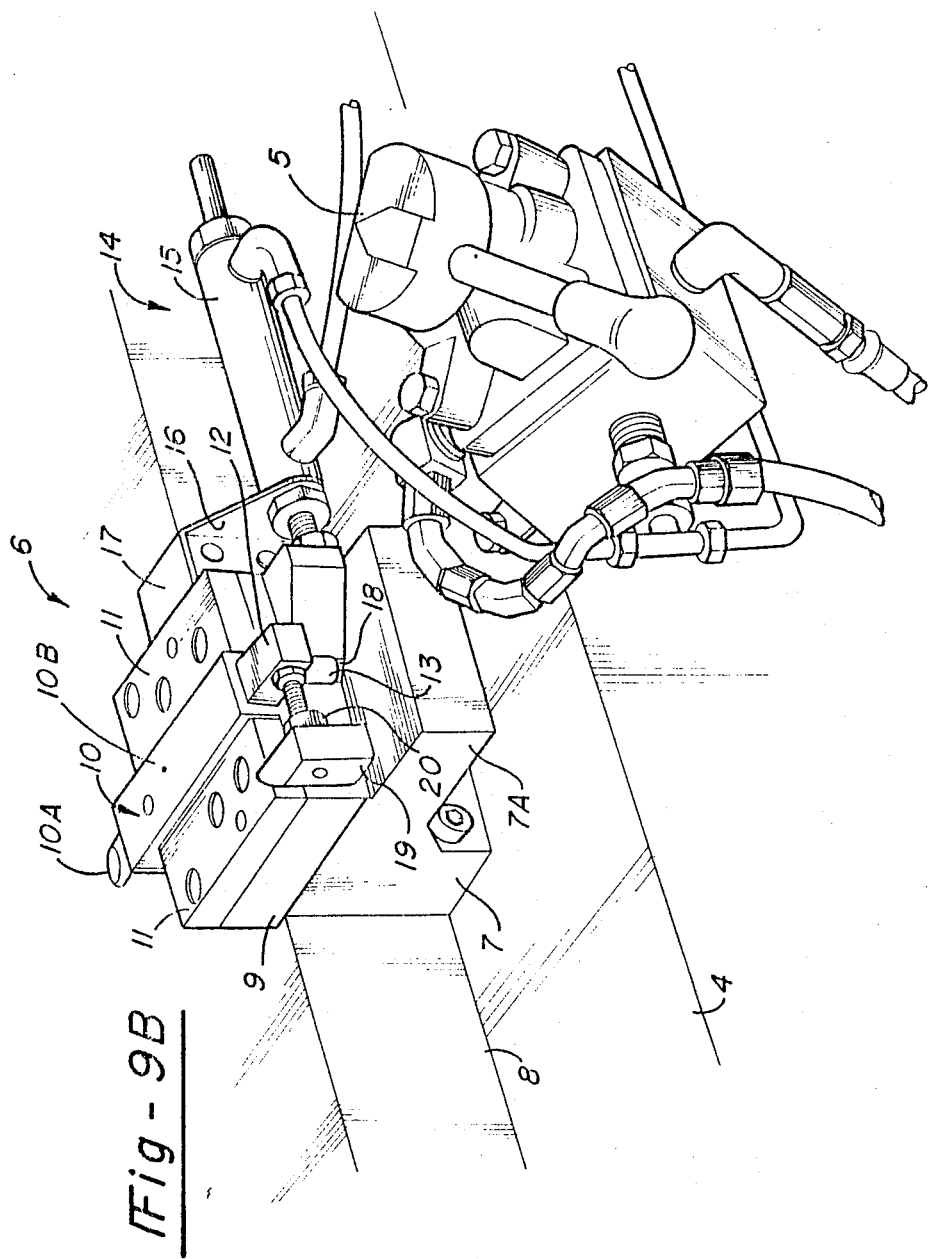
FIG. 9B is a perspective view of the hydraulically operated wedge lock clamp in the engaged position.
Figure 9C:
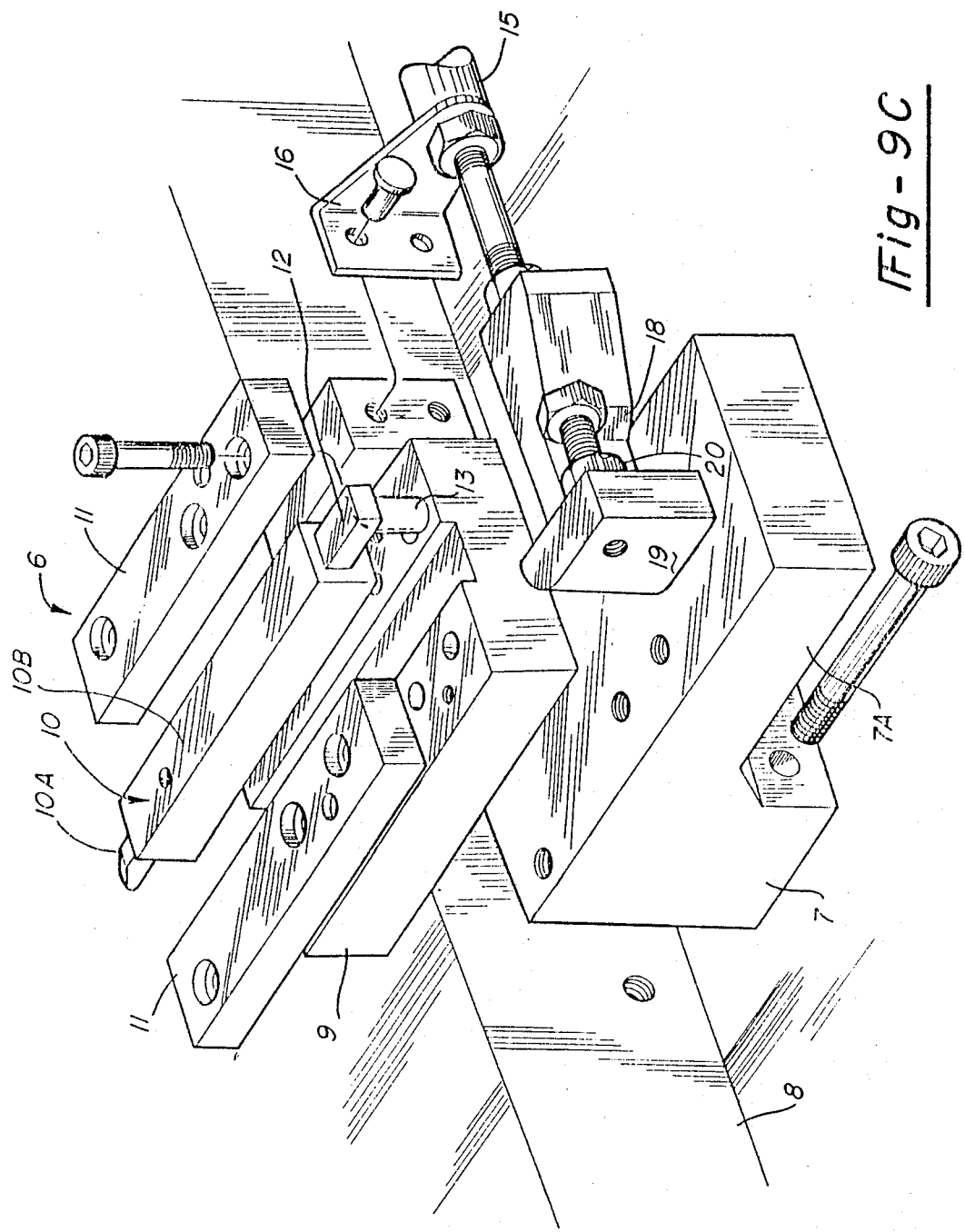
FIG. 9C is an exploded view of the wedge lock clamp shown in FIGS. 9A and 9B.
Figure 10:
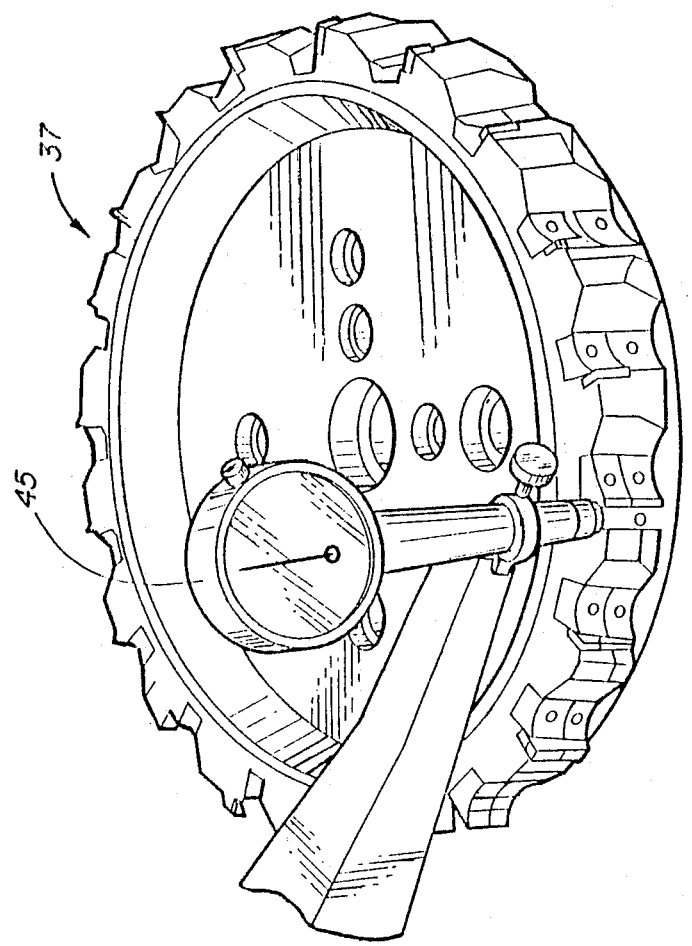
FIG. 10 is a perspective view of a cutting wheel being set up with cutters.
Figure 11:
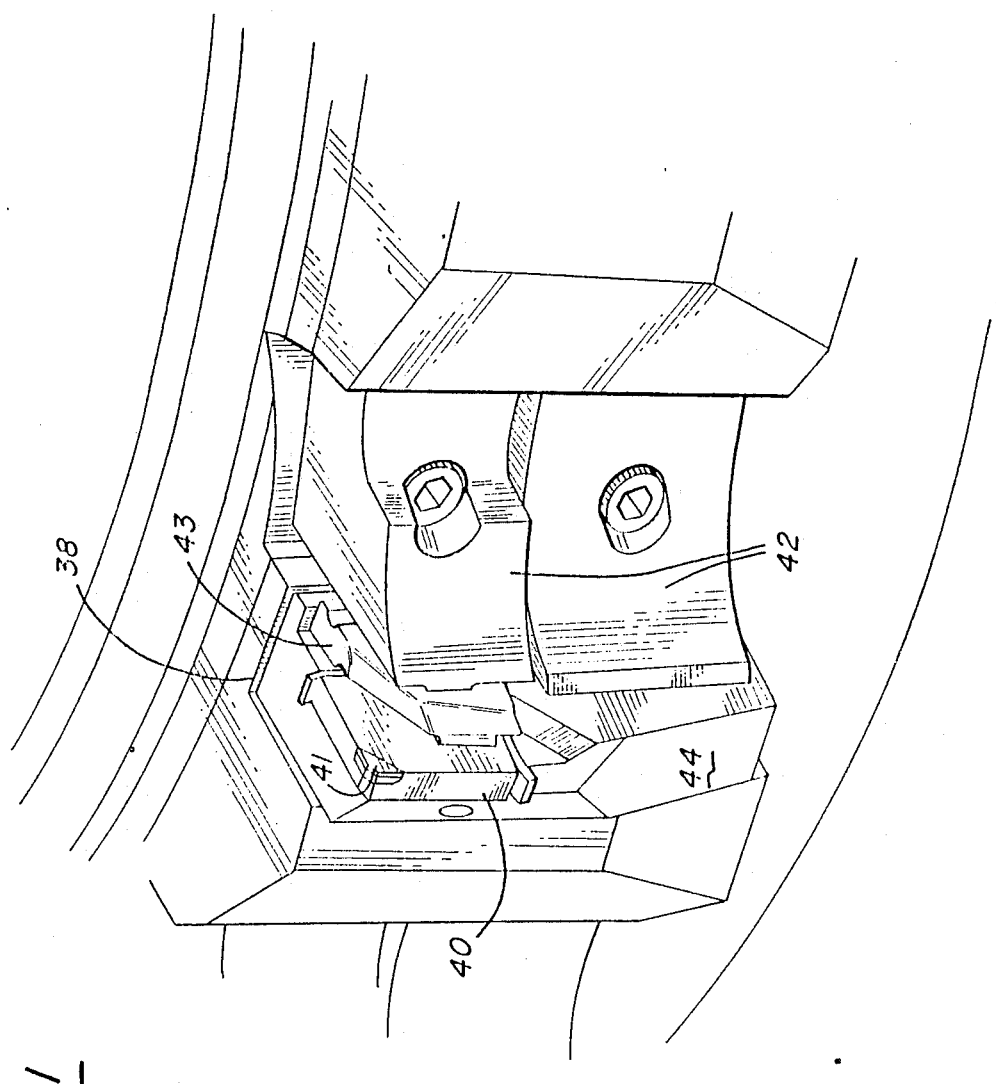
FIG. 11 is a perspective view of a cutter blown up to show detail including the insert cartridge.
Figure 12:
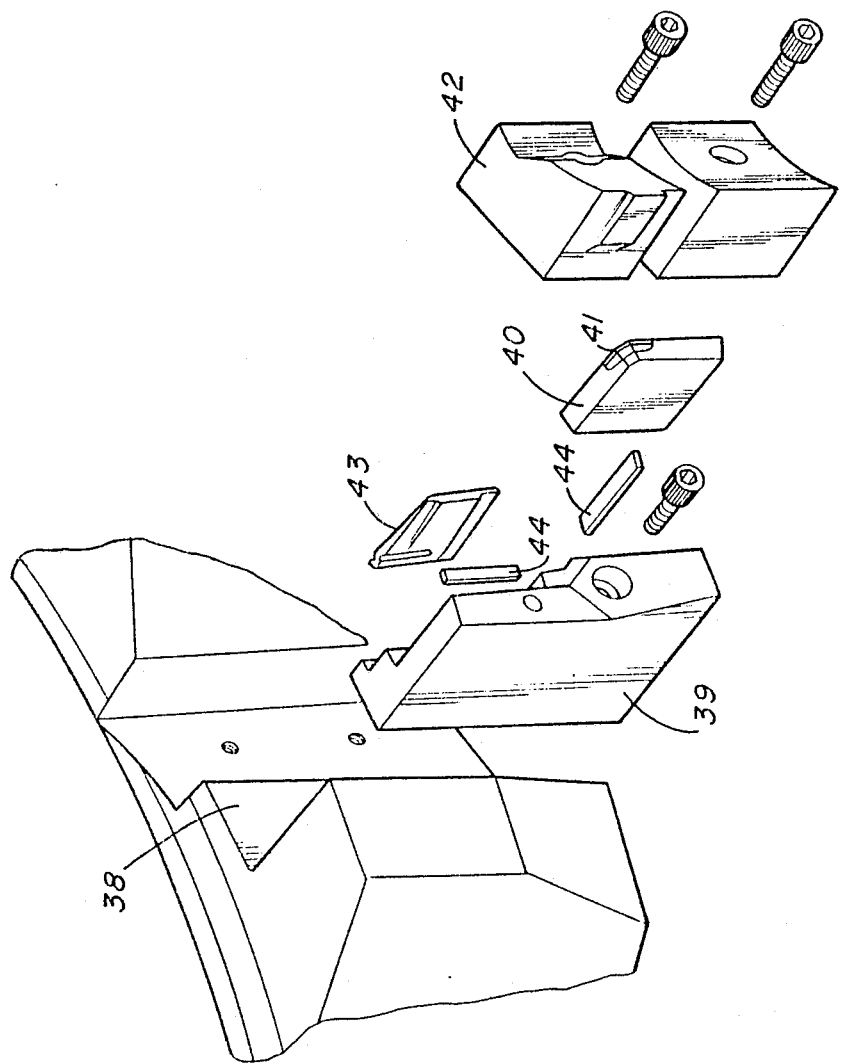
FIG. 12 is an exploded view of a cutter insert cartridge assembly.
Figure 13:
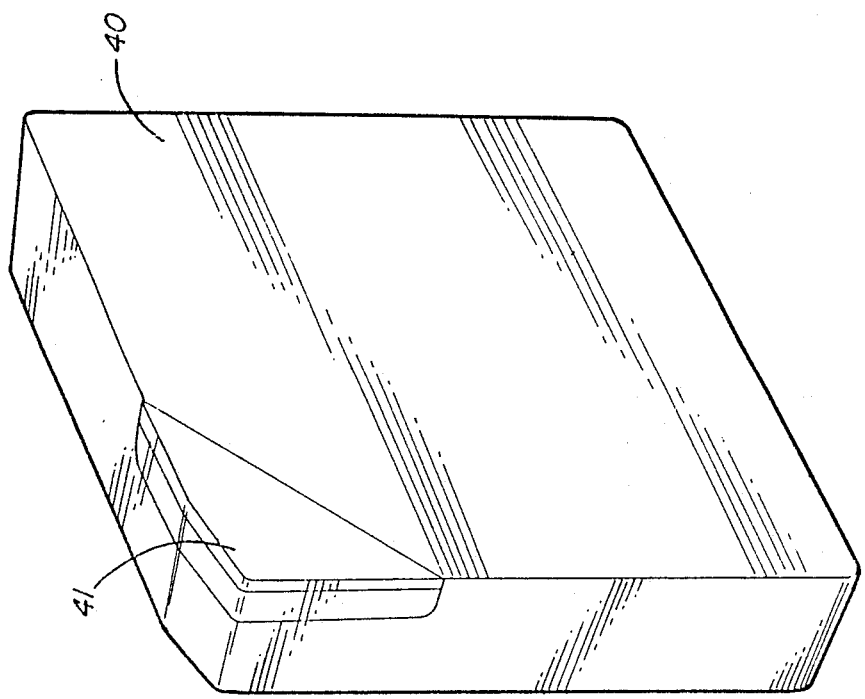
FIG. 13 is an extreme blown up view to show the modified cutter.

A wedge lock clamp 6 is used to dampen vibration in the workpiece along the Z axis. Referring specifically to FIGS. 9A-9C, the wedge lock clamp 6 includes a support block 7 having a rearward facing flange 7A that is secured to a third foundation 8, parallel to the surface of the second foundation 4, raised a few centimeters above the plane of the second foundation 4. The support block 7 is thickest closest to the side of the third foundation 8.

Supported by the support block 7 is an upper support block 9 that has the same width as the support block 7. The upper support block 9 lies about 5 centimeters out from the support block 7 over the third foundation 8. It covers about ⅝ of the length of the support block 7, from front to back and its width is coextensive with the support block 7. The upper support block 9 supports a movable supporting pin structure 10 that slides over it perpendicularly. On top of the upper support block 9 are two elongated rectangular blocks 11 that form a passageway between them for the movable supporting pin structure 10. The blocks 11 are secured to the upper support block 9 by bolts. In the passageway formed by the blocks 11 lies the movable supporting pin structure 10. A forward end 10A of the movable supporting pin structure 10 (the end closest to the position of the workpiece) is rounded on the side nearest the third foundation 8 and tapered on the opposite side, the tapered side supporting the workpiece in the actuated position. The movable supporting pin structure 10 has a main portion 10B that is rectangular. It has a single hole on the top of its frontward end (the end closest to the workpiece). A few centimeters beyond this hole, the main portion 10B of the rectangular block ends and the pin-like structure at the forward end 10A protrudes from its center front (the surface facing the workpiece). The pin is cylindrical at the end connected to the rectangular block and takes the shape described above at the opposite end. A second rectangular block 12 protrudes from the opposite end of the main portion 10B of the rectangular block that is smaller in dimension than the main portion 10B. The second rectangular block 12 is about 25 millimeters long. Secured to the second rectangular block 12 about midway along its length and extending downward therefrom is a metal cylinder 13. The cylinder 13 extends downward to within a few millimeters of the flange 7A. The metal cylinder 13 may be fixed in a hole extending vertically through the second rectangular block 12.

At the unit's side furthest from the workpiece is a mechanism 14 for operating the unit. The first item observed is a hydraulic cylinder 15 to the right of the entire unit. A suitable hydraulic cylinder is manufactured by Bimba. It is affixed to a brace, or basket 16, that is bolted to a block 17. The block 17 is bolted to the third foundation 8. The hydraulic cylinder 15 is connected to a tapered slide member 18 that is actuated as the cylinder is operated from one position to another. The tapered slide member 18 acts as a cam surface to actuate the movable supporting pin structure 10 to the actuated position by a spring 10C (see FIG. 15). The shape of the tapered slide member 18 begins as a brief rectangle and then begins to taper toward the workpiece, levels off, and then tapers toward the workpiece again and then finally levels off. The tapering takes place between the front and the back; the top and its sides are flat. The end of the tapered slide member 18 is connected to a block 19. The block 19 moves with the motions of the hydraulic cylinder 15. A bolt 20 protrudes from the upper part of the block 19. The bolt 20 is positioned so that it hits the smaller second rectangular block 12 that is part of the movable supporting pin structure 10. By hitting the second rectangular block 12, the bolt 20 wedges the main portion 10B between the two positioning blocks 11, thereby locking the movable supporting pin structure 10 in its actuated position.

Figure 18A:
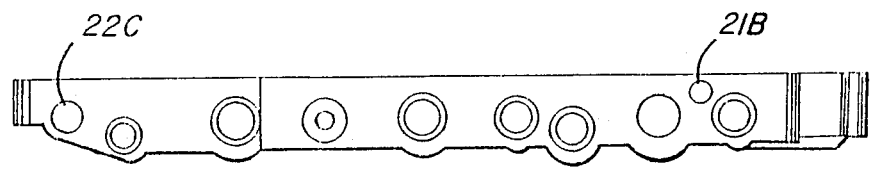
FIGS. 18 A, B, C and D are side views of the workpiece taken in directions A-D, respectively, as shown in FIG. 16.

A fixed locating pin is shown at 21 in FIGS. 2–8. This pin is supported by an inverted "T" shaped block having a T or bottom portion with a given width, and a narrower "leg" that spans the width of the bottom and beyond. The leg lies across the center of the top of the "T" part. At the end of the extension is a semispherical point 21A. This point locates in the right rear cast locating hole 21B of the workpiece (see FIG. 18A). It locates the workpiece in X, Y and Z space at that single point. The block is fixed to the third foundation 8 by at least five bolts. The block is flush mounted with the foundation with corrections for height being made by placing shims between the block and foundation. The block is made of a sturdy metal material.

At 22 is a second locating pin structure including a block 22A. The block 22A has two parallel sides, one longer than the other, a side perpendicular to them and between them and an angled side opposite the two perpendicular sides. The angled side parallels an angled rear portion of the workpiece 2A. The block supports a locating pin 22B. The pin is freely located inside the block. By freely located, it is meant that the pin may be allowed to wobble slightly parallel to the Z plane. The pin lies horizontally inside the block and outwardly protrudes on the angled side. This pin may be actuated into and out of the block (hydraulically or pneumatically as is well known in the art) or may be fixed pin similar to the locating pin 21. The motion is parallel to the two parallel sides. When the pin is in the out position and the workpiece is in the in position, this pin locates in a left rear cast locator hole 22C (see FIG. 18A) of the workpiece.

The locating pin 22B is an elongated rectangular block which tapers at the protruding end. This taper tapers again at an angle greater than the first taper. It is this portion that must actually fit into the left rear cast locator hole 22C to accurately position parts from different dies. The second taper is configured to locate in the hole at a given position. The pin taper must be able to engage the upper and lower sides of the locating hole without touching the back of the hole.

Vibration dampening mechanisms are located at 23 and 24. These mechanisms 23 and 24 are of similar or identical construction and, thus, a detailed description of the vibration dampening mechanism 23 will suffice for both mechanisms 23 and 24. Referring to FIG. 2, the dampening mechanism 23 includes a solid square lower block 23A located on the third foundation 8. A rectangular tapered block 23B is above the lower block 23A. Both blocks are secured by a minimum of four bolts. The upper tapered block 23B has a portion extending forward of the lower block in the direction of the position of the workpiece station. The upper tapered block 23B also has an opening in this extended part. A pin 23C lies inside the opening and is movable. The pin 23C is hydraulically or pneumatically actuated. When the switch is in the off position, it retreats into the upper block; when in the on position, it moves forward, out of the block. The pin 23C has an end that tapers down to a point. As the pin moves forward (advancing in an arc), the point engages the workpiece. It presses against the workpiece acting to dampen frequency vibration in the workpiece created by the milling operation.

Figure 17:
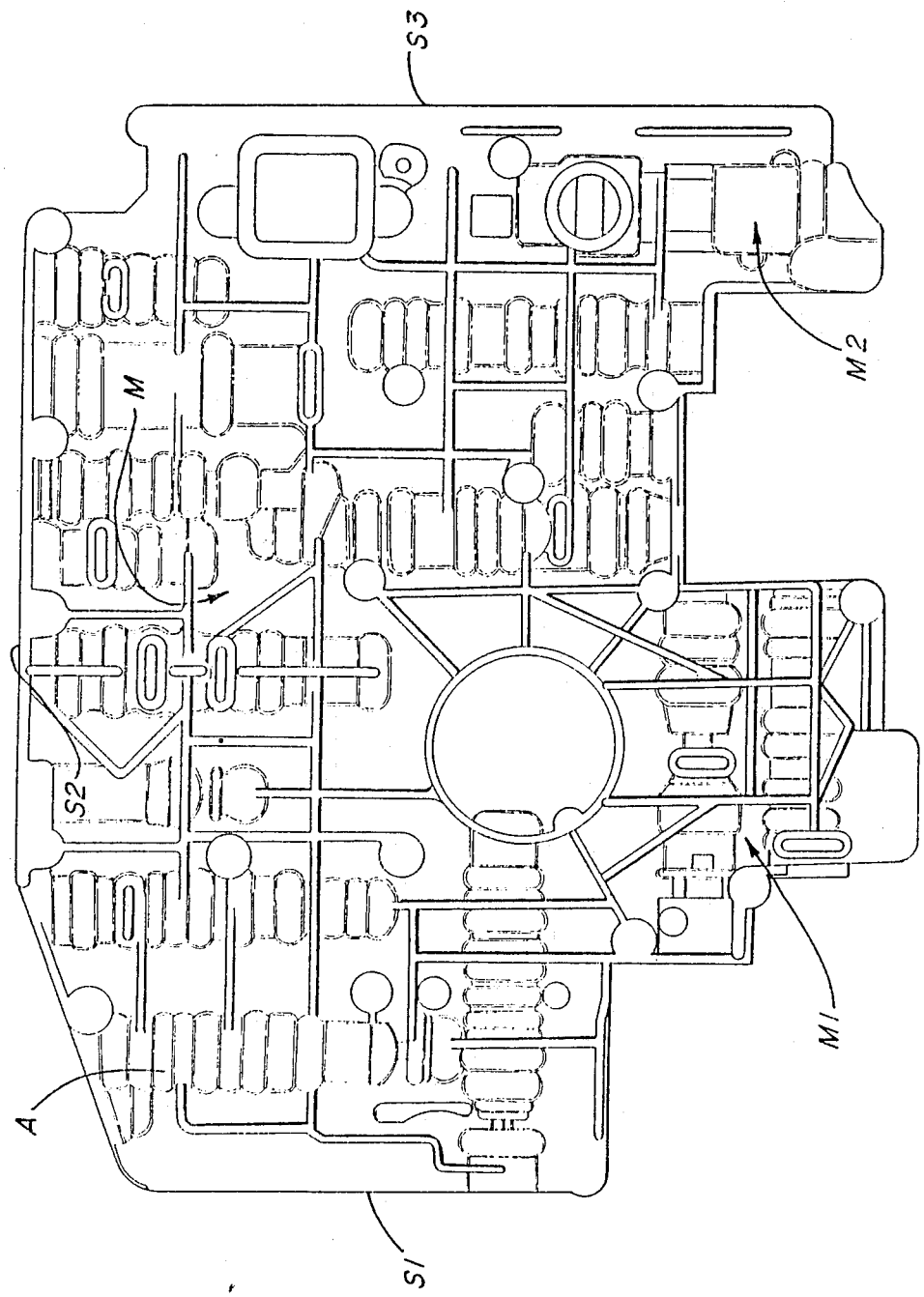
FIG. 17 is a plan view of the bottom of the workpiece.

Located at 25 and 26 are push clamps of similar construction. The structure of the push clamp 25 will be described as representative of each push clamp 25 and 26. The push clamp 25 includes a solid block bolted to the third foundation 8. On the top of the block is a spring actuated push clamp 25A. As shown in FIG. 19, the spring actuated push clamp 25A includes a spring 25C and a forward flat metal piece 25B, the forward flat metal piece 25B having a lead edge 25D and an arcuate flange 25E. The spring acts on the forward flat metal piece 25B that is perpendicular to the spring's axis. The flat metal piece 25B has a flange that angles backwards towards the spring beginning about two thirds the distance from the bottom thereof. The flange shape is generally that of a curve. The flange provides a lead edge for insertion of the workpiece 2A into the fixture following engagement of the locating pins 21 and 22 in the cast locating holes 21B and 22C. After workpiece side S2 (see FIG. 17) engages the fixture, the opposite side is pivoted downwardly to slide downwardly along the flange until it rests against the lower portion of the flat metal piece 25B. Once the workpiece 2A is in place, the flat metal piece 25B pushes, as a result of the spring, against the workpiece securing it against the two rearward locating pins. The spring's housing is circular. The push clamp 25 has a smaller forward metal piece than the push clamp 26 allowing the push clamp 25 to be positioned closer than otherwise possible to a forward movable locating pin structure 27, to be described below. The push clamps 25 and 26 engage different portions of the workpiece, namely, ears M1 and M2 of the workpiece that project out from the workpiece's main body M (see FIG. 17).

Figure 18B:
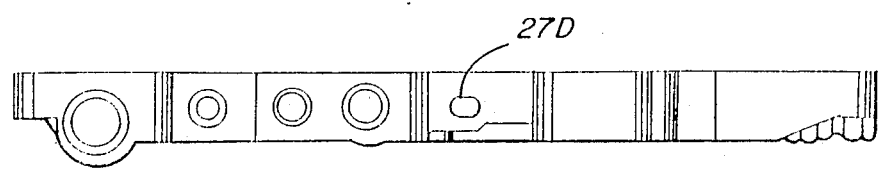
Figure 18C:
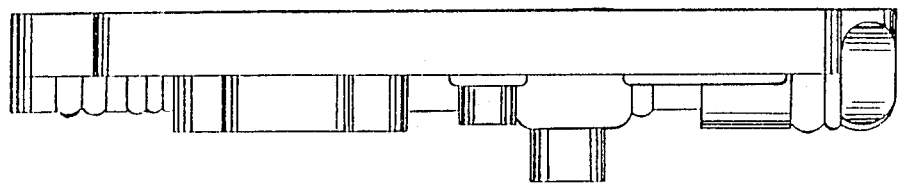
Figure 18D:
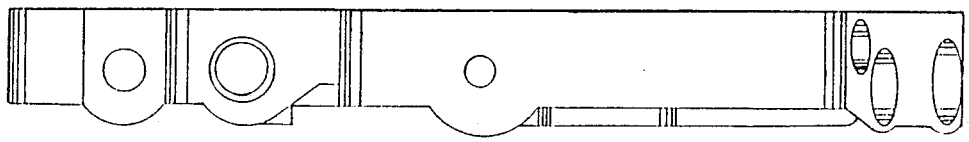

At 27 is located the forward movable locating pin structure including a movable locating pin 27A supported by a first a solid block 27B that is securely affixed to the third foundation 8. A second upper block 27C is secured to the first block 27B. The second upper block 27C has a passageway through it that goes from the front to the rear, the front being the position nearest the workpiece. The locating pin 27A lies in the passageway and is hydraulically or pneumatically actuated as is well known generally. The pin's motion is toward and away from the casting (workpiece 2A). The front of the second upper block 27C is parallel to the portion of the workpiece 2A which it faces. The locating pin 27A, when in its forward position, locates in a forward cast locating hole 27D of the workpiece (see FIG. 18B). This cast locating hole has the same configuration as the right rear cast locating hole 21B. The second upper block 27C is smaller than the lower first block 27B. The second upper block 27C is not as long nor as wide as the lower first block 27B. The second upper block 27C is located towards the center front of the lower first block 27B and is secured to the lower first block 27B via four securing bolts located in each of the corners. The locating pin 27A has an elongated rectangular shape and a narrow pin-like projection at the forward end. The narrow pin-like projection is the part of the locating pin 27A that actually enters, positions, and secures the workpiece. This pin-like projection has a tapered edge that engages the upper and lower sides but not the back of the forward cast locating hole 27D.

Figure 14:
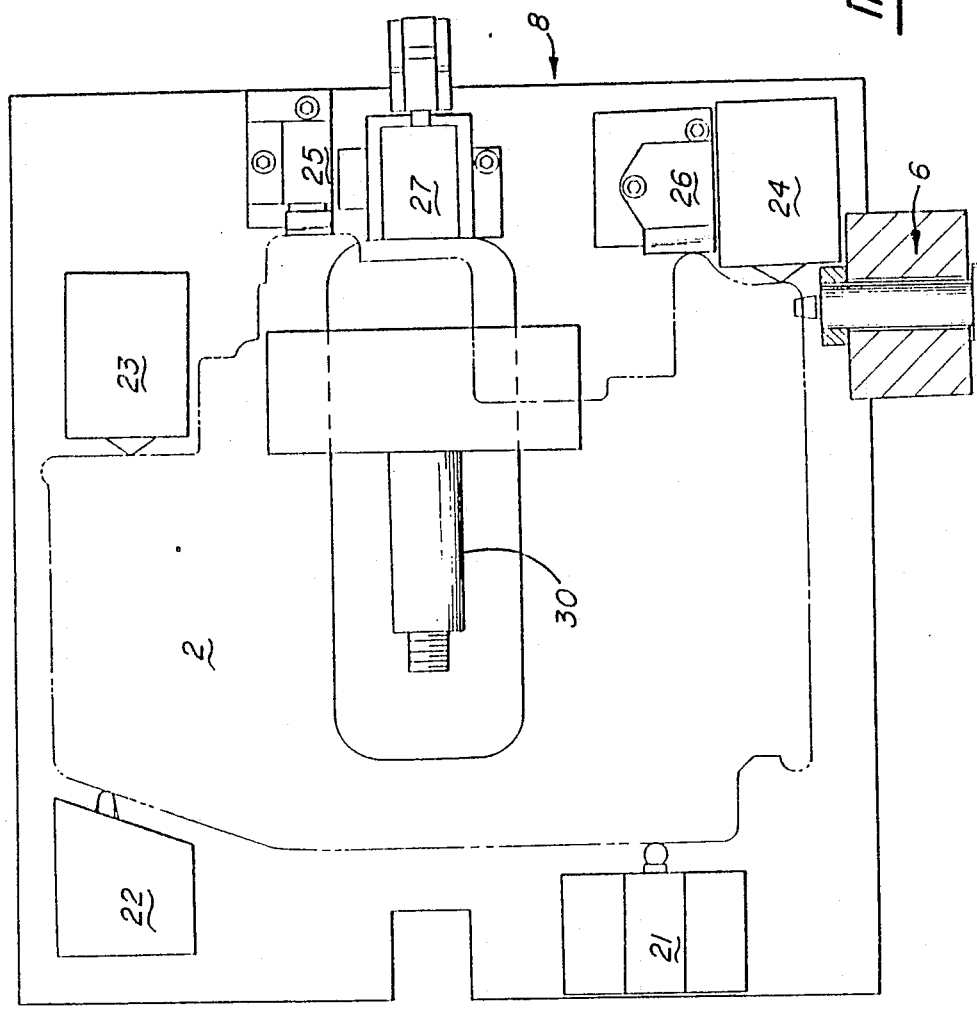
FIG. 14 is a plan view of the fixture used to support the automobile transmission control valve body shown in outline form.
Figure 15:
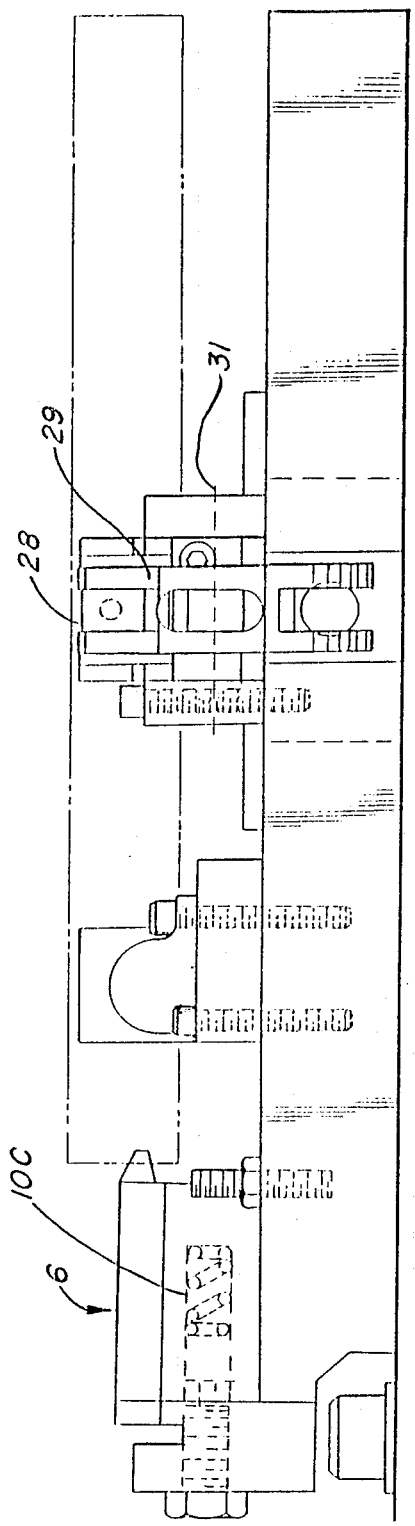
FIG. 15 is a side view of the fixture used to support an automobile transmission control valve body shown in partial outline form.
Figure 16:
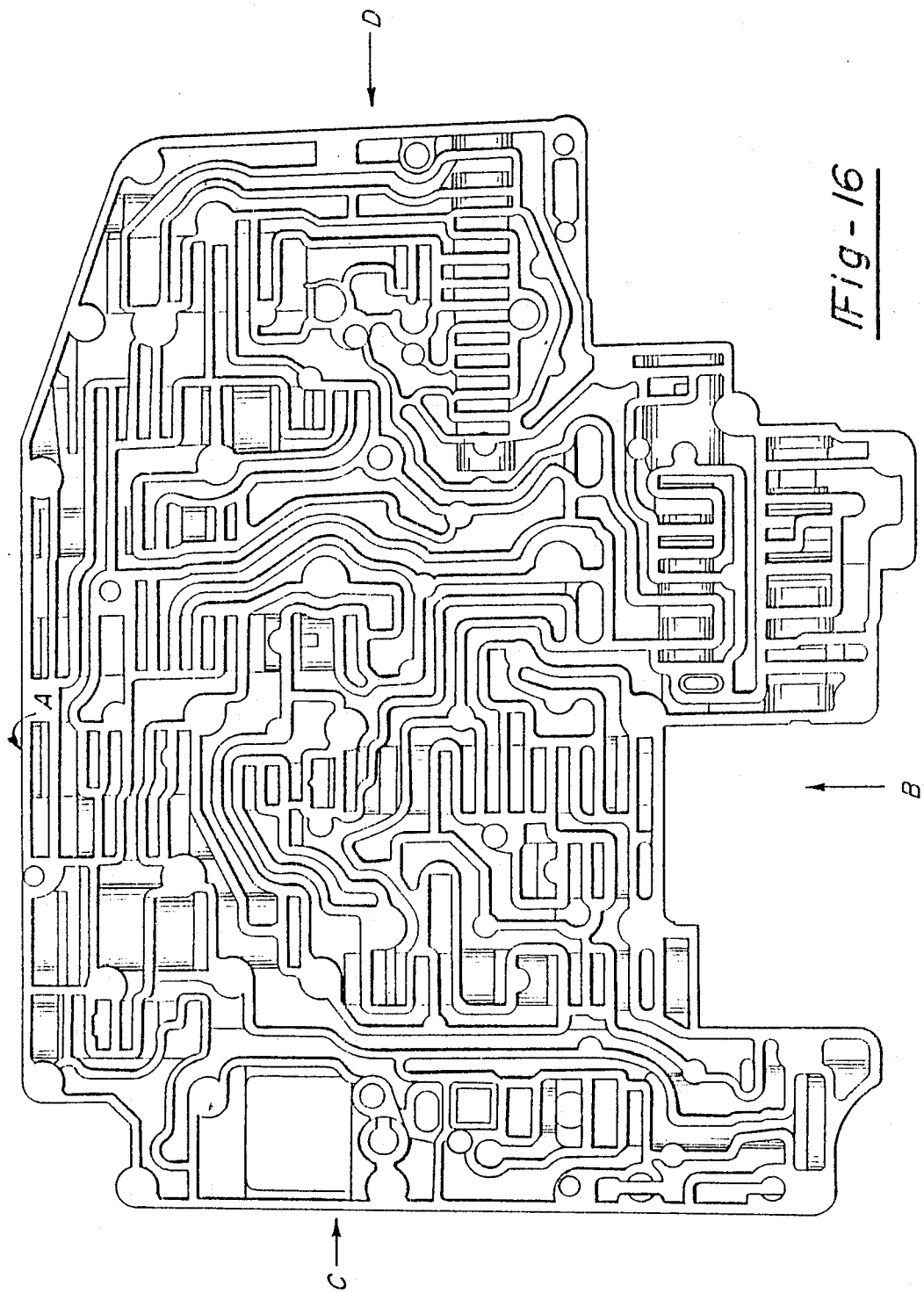
FIG. 16 is a plan view of the workpiece's Z, or top surface.

As best seen in FIG. 15, the rear of the locating pin 27A has a cylindrical bolt 28 going through it in a perpendicular direction. A bar 29 is split around the cylindrical bolt 28 on one end and on both sides and attached to a hydraulic (or pneumatic) cylinder 30 (FIG. 14) on the other end. The bar pivots around an axis 31 just below the cylindrical bolt 28. Actuation of the hydraulic cylinder 30 causes the forward end of the locating pin 27A to move into the forward cast locating hole 27D clamping the workpiece against it and the two rearward locating pins 21 and 22B. Deactuation of the hydraulic cylinder 30 causes the locating pin 27A to retreat from the forward cast locating hole 27D. Shims may be located between the second upper block 27C and the lower first block 27B to ensure that the second upper block 27C is in the proper Z plane.

Referring to FIG. 2, located at 32, 33, and 34 are three premilling vertical rough positioning support pins. The pin 32 is a rubber tipped pin and, in combination with the nearby fixed cast locating pin 21, is the initial point of contact between the workpiece 2A and the fixturing apparatus. After this contact is made, the workpiece is brought down into the fixturing apparatus to rest on the support pins 32, 33 and 34 and is secured by the push clamps 25 and 26. Posts 35 and 36 situated on the right and left sides of the fixture, are used to confine the workpiece between their positions on the fixture for lateral rough positioning. Once the workpiece is in rough position, the hydraulically operated forward movable locating pin structure 27 is operated and raises the workpiece off the prepositioning support members for the milling process.

Referring to FIGS. 10–14, the cutting tool used to mill the Z surface of the workpiece 2A secured precisely in the fixture of the present invention is a large diameter circular face mill 37. The face mill 37 has pockets 38 on its periphery which contain cartridge bodies 39 which hold cutting inserts 40 having brazed diamond tips 41. Clamps 42 and wedges 43 retain the cartridge bodies 39 and inserts 40 in the pockets 38. Shims 44 provide for adjustment of the height of the cutting edge which can be precisely measured with a dial indicator 45.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An apparatus for precise positioning and securing of a relatively flexible die casting which minimizes distortion and vibration of said casting during a machining operation, said apparatus comprising:
   a plurality of cast locating pins;
   at least two opposed circumferential edge portions of said casting, said at least two opposed circumferential edge portions having mating holes engagable with said plurality of cast locating pins to provide precise vertical positioning of said casting for machining;
   external actuation means in communication with at least one of said plurality of cast locating pins, said at least one of said plurality of cast locating pins being longitudinally movable via said external actuation means to engage and disengage from the casting;
   vibration dampening means engagable with at least one of said at least two opposed circumferential edge portions of said casting; and
   push clamp means mounted to press said casting against two of said locating pins prior to engagement of said at least one said plurality of cast locating pins with said casting.

2. An apparatus according to claim 1, wherein said push clamp means comprises two spring biased push clamps adjacent said at least one movable cast locating pin and on opposite sides thereof.

3. An apparatus according to claim 2, wherein each of said two spring biased push clamps has an arcuate flange which provides a lead edge for insertion of said casting into said apparatus.

4. An apparatus for precise positioning and securing of a relatively flexible die casting which minimizes distortion and vibration of said casting during a machining operation, said apparatus comprising:
   cast locator means;
   at least two opposed circumferential edge portions of said casting, said at least two opposed circumferential edge portions having mating holes engagable with said cast locating means to provide precise vertical positioning of said casting for machining;
   a protruding ear portion of said casting; and
   a wedge lock clamp mounted for engagement with said protruding ear portion of said casting, said wedge lock clamp providing vibration dampening.

5. An apparatus according to claim 4, wherein said wedge lock clamp comprises a slidable supporting pin structure which is tapered on an upper casting contacting side.

6. An apparatus according to claim 4, wherein a supporting pin of said wedge lock clamp is biased via a spring to be engaged with said protruding ear portion of said casting, said supporting pin being actuated to engage and disengage said protruding ear portion of said casting via a movable camming surface.

7. An apparatus according to claim 6, wherein said wedge lock clamp further comprises an abutment means movable with said movable camming surface to engage a rearward portion of said supporting pin to lock said supporting pin in engagement with said casting.

8. A method for precisely positioning and securing for machining a relatively flexible die casting having at least one protruding ear portion, said method comprising the steps of:
   precisely locating and securing said casting horizontally and vertically in a fixture;
   providing vibration dampening means contacting said at least one protruding ear portion;
   engaging at least one cast locator hole of said casting with at least one cast locating pin of said fixture; and
   pivoting said casting downward into engagement with spring biased push clamping means.

* * * * *